(12) United States Patent
Hugher (10) Patent No.: US 8,794,382 B2
(45) Date of Patent: Aug. 5, 2014

(54) COLLAPSIBLE TREE STAND DEVICE WITH INTEGRATED STORAGE AND MOUNTING SYSTEM

(76) Inventor: Jeff Hugher, Haines City, FL (US)

( * ) Notice: Subject to any disclaimer, the term of this patent is extended or adjusted under 35 U.S.C. 154(b) by 0 days.

(21) Appl. No.: 13/433,487

(22) Filed: Mar. 29, 2012

(65) Prior Publication Data

US 2013/0256059 A1 Oct. 3, 2013

(51) Int. Cl.
*A01M 31/02* (2006.01)
(52) U.S. Cl.
USPC ......... 182/187; 182/138; 182/222; 248/218.4
(58) Field of Classification Search
USPC .................. 182/187, 188, 222, 138, 223; 248/218.4, 95, 97, 220.1
See application file for complete search history.

(56) References Cited

U.S. PATENT DOCUMENTS

| | | | | |
|---|---|---|---|---|
| 2,723,885 | A * | 11/1955 | Dietz | 182/57 |
| 4,134,474 | A * | 1/1979 | Stavenau et al. | 182/187 |
| 4,199,170 | A * | 4/1980 | Hubner et al. | 280/641 |
| 4,708,221 | A * | 11/1987 | Kubiak | 182/187 |
| 4,787,476 | A * | 11/1988 | Lee | 182/116 |
| 4,805,748 | A * | 2/1989 | Gerch | 190/103 |
| 4,852,687 | A * | 8/1989 | Hittler | 182/129 |
| 4,901,513 | A * | 2/1990 | Kim et al. | 56/329 |
| 4,925,071 | A * | 5/1990 | Fleming et al. | 224/604 |
| 4,936,416 | A * | 6/1990 | Garon | 182/187 |
| 5,165,500 | A * | 11/1992 | Bass | 182/187 |
| 5,199,527 | A * | 4/1993 | Jennings | 182/187 |
| 5,427,344 | A * | 6/1995 | Beauchemin | 248/218.4 |
| 5,518,083 | A * | 5/1996 | Blennert | 182/188 |
| 5,538,101 | A * | 7/1996 | Kempf | 182/116 |
| 5,868,295 | A * | 2/1999 | Carriere | 224/404 |
| 5,979,602 | A * | 11/1999 | Grout | 182/142 |
| 6,170,609 | B1 * | 1/2001 | Dech | 182/187 |
| 6,179,187 | B1 * | 1/2001 | Lemire et al. | 224/640 |
| 6,209,768 | B1 * | 4/2001 | Boaz | 224/314 |
| 6,325,174 | B1 * | 12/2001 | Lamar | 182/187 |
| 6,336,520 | B1 * | 1/2002 | Amacker | 182/187 |
| 6,536,590 | B1 * | 3/2003 | Godshaw et al. | 206/373 |
| 6,571,916 | B1 * | 6/2003 | Swanson | 182/187 |
| 6,575,626 | B1 * | 6/2003 | Gillespie et al. | 383/34.1 |
| 6,684,812 | B1 * | 2/2004 | Tucker | 119/57.91 |
| 6,883,644 | B1 * | 4/2005 | Braun et al. | 182/187 |
| 7,174,995 | B1 * | 2/2007 | Alexander | 182/187 |
| 7,377,361 | B1 * | 5/2008 | Tschida | 182/188 |
| D601,484 | S * | 10/2009 | Alfonso | D12/416 |
| 7,926,775 | B1 * | 4/2011 | Milazzo et al. | 248/230.8 |
| 8,020,931 | B2 * | 9/2011 | Frady | 297/219.1 |

(Continued)

OTHER PUBLICATIONS

Definition of the term "compartment" found in Action Collins English Dictionary—Complete and Unabridged © HarperCollins Publishers 1991, 1994, 1998, 2000, 2003.*

*Primary Examiner* — Katherine Mitchell
*Assistant Examiner* — Daniel Cahn
(74) *Attorney, Agent, or Firm* — Jason T. Daniel, Esq.; Daniel Law Offices, P.A.

(57) ABSTRACT

A collapsible tree stand system for supporting a user at an elevated position on a tree includes a tree engagement member having a mounting plate, a plurality of tree gripping teeth, a retention strap and a connection member. The system also includes a removable, collapsible tree stand having an integrated frame with a gapped section for mating with the connection member, and for supporting a seat, a central platform and a pair of storage compartments thereon.

16 Claims, 9 Drawing Sheets

(56) References Cited

U.S. PATENT DOCUMENTS

| | | | |
|---|---|---|---|
| 8,177,177 B2* | 5/2012 | Ehrig et al. | 248/218.4 |
| 8,205,626 B2* | 6/2012 | Myers | 135/90 |
| 2003/0024559 A1* | 2/2003 | Fields | 135/90 |
| 2003/0129038 A1* | 7/2003 | Addy | 410/97 |
| 2004/0040784 A1* | 3/2004 | Johnson | 182/113 |
| 2005/0120692 A1* | 6/2005 | Kim | 56/1 |
| 2006/0180393 A1* | 8/2006 | Peruski | 182/187 |
| 2007/0000726 A1* | 1/2007 | Berkbuegler | 182/187 |
| 2007/0261919 A1* | 11/2007 | Roe | 182/187 |
| 2008/0164098 A1* | 7/2008 | Groves et al. | 182/129 |
| 2008/0169156 A1* | 7/2008 | Leishman et al. | 182/187 |
| 2009/0277721 A1* | 11/2009 | Weir | 182/115 |
| 2009/0321186 A1* | 12/2009 | Louchart | 182/188 |
| 2010/0071997 A1* | 3/2010 | Green | 182/187 |
| 2010/0300808 A1* | 12/2010 | Hale | 182/187 |
| 2011/0056766 A1* | 3/2011 | Maglieri et al. | 182/129 |
| 2011/0297481 A1* | 12/2011 | Copus | 182/113 |
| 2011/0308887 A1* | 12/2011 | Johnson | 182/187 |

* cited by examiner

*FIG. 1*

(BACKROUND ART)

COLLAPSIBLE TREE STAND DEVICE WITH INTEGRATED STORAGE AND MOUNTING SYSTEM

TECHNICAL FIELD

The present invention relates generally to hunting, camping, and sportsmen equipment, and more particularly to backpack type tree stand having an integrated storage system capable of being quickly and easily mounted onto a tree.

BACKGROUND

The statements in this section merely provide background information related to the present disclosure and may not constitute prior art.

Figure 1:
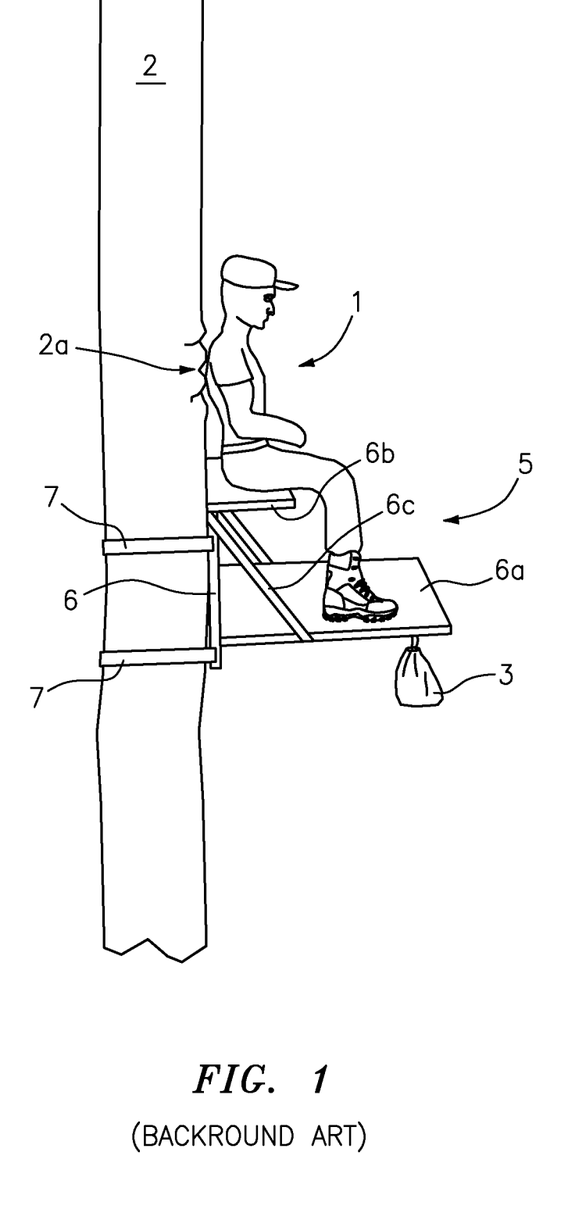
FIG. 1 is a side view of a tree stand in accordance with background art.

Numerous devices for attachment to trees and the like, in order to provide an elevated observation area for hunting and/or bird watching have been previously disclosed in the art. FIG. 1 illustrates one example of a conventional tree stand 5 that includes a vertical central frame 6 that is strapped 7 directly to the side of a tree 2. A lower platform 6a is typically connected to the bottom of the frame, and supported by a cable 6c in order to provide an area where a user can stand. Likewise, a smaller platform 6b is typically connected to the top of the frame where the user can sit.

As shown, conventional tree stands suffer from a problem due to the close proximity of the frame 6 and the tree 2. To this end, the user 1 attempting to sit on the seat 6b has very little back room, and must often sit on the outermost portion of the seat, which is extremely uncomfortable and ergonomically unfriendly. Additionally, when the surface of the tree is not smooth, which is usually the case, raised bumps and notches 2a further act to discomfort the user. Over time, these discomforts can cause a user to constantly shift their body position, which can lead to long term back pain and acts to greatly increase the chances of accidentally falling off of the platform.

Moreover, owing to the extremely limited space within the stand, it is common practice for hunters to clip backpacks 3 and other such items to the bottom of the stand 6a in order to keep from having to climb to the ground each time an object is needed. However, getting access to the hanging bag 3 can be extremely awkward as a user must often reach beneath the surface of the lower platform in order to access the bag. Alternatively, the bag can be placed on top of the lower platform 6a, but such action further reduces the available space to the user, which raises the likelihood of the user tripping over the bag and falling off of the platform, or accidentally knocking the bag 3 itself off of the platform.

Accordingly, the need exists for a tree stand with an integrated storage and mounting system that does not suffer from the drawbacks discussed above.

SUMMARY OF THE INVENTION

The present invention is directed to a collapsible tree stand system for supporting a user at an elevated position on a tree. One embodiment of the present invention can include a tree engagement member having a mounting plate, a plurality of tree gripping teeth, a retention strap and a connection member. The present invention can also include a removable tree stand having an integrated frame with a gapped section for mating with the connection member, and for supporting a seat, a central platform and a pair of storage compartments thereon.

Another embodiment of the present invention can include a pair of side platforms.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Figure 3:
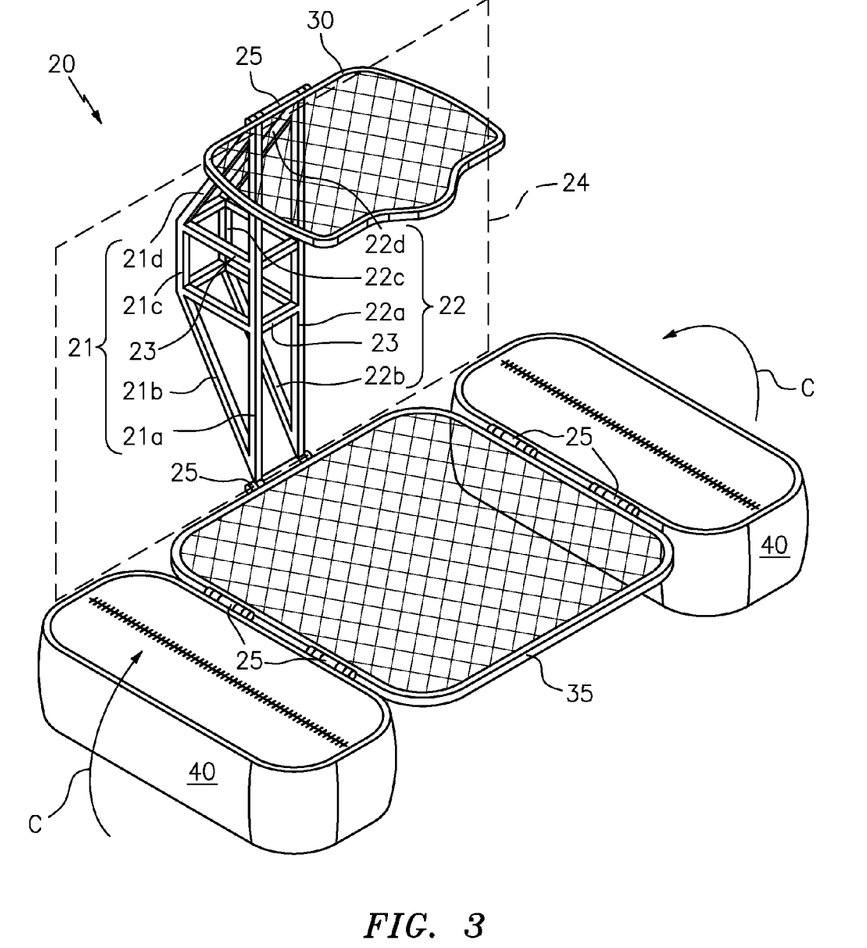
FIG. 3 is a perspective view of a collapsible tree stand device in accordance with one embodiment of the present invention.

For purposes of this description, the terms "upper," "bottom," "right," "left," "front," "vertical," "horizontal," and derivatives thereof shall relate to the invention as oriented in FIG. 3.

A collapsible tree stand device with integrated storage and mounting system includes a tree engagement member 10, and a removable, collapsible tree stand device 20 having an ergonomically friendly seat 30 and a pair of integrated storage compartments 40.

Figure 2A:
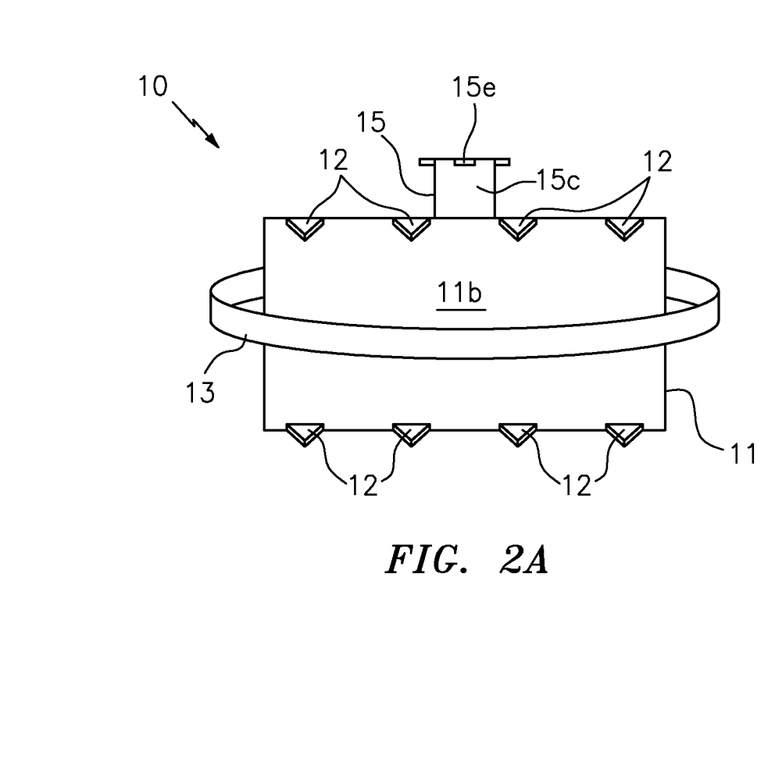
FIG. 2a is a back view of a tree engagement member in accordance with one embodiment of the invention.
Figure 2B:
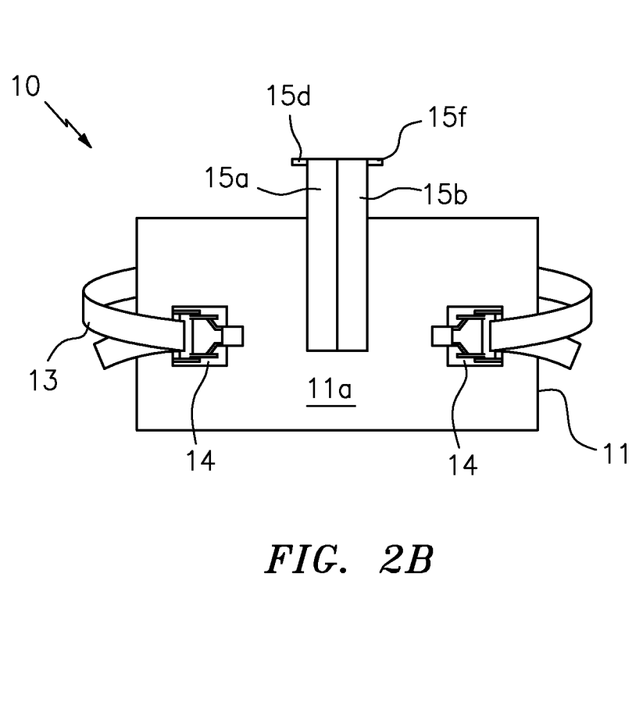
FIG. 2b is a front view of a tree engagement member in accordance with one embodiment of the invention.

FIGS. 2a and 2b illustrate one embodiment of a tree engagement member 10. As shown, the mounting plate can include a front surface 11a, and a back surface 11b having a plurality of outward radiating teeth 12 configured to grip the surface of a tree trunk. A retention strap 13 can be secured to the front surface of the mounting plate 11a via one or more adjustable ratchets 14. The strap 13 can be configured to wrap around the tree trunk in order to securely embed the teeth 12 in a manner that will prevent movement of the device. As described herein, the mounting plate 11 can preferably be constructed from a strong metallic material having excellent tensile strength and weather resistant qualities, such as aluminum or steel, and the strap 13 can preferably be constructed from weather resistant nylon webbing. The mounting plate 11 can include a substantially flat shape, or can be curved to better conform to the shape of a tree. Of course any number of other materials can also be utilized herein.

The engagement member 10 can also include a connection shaft 15 extending vertically from the top of the mounting plate 11 in order to provide a base onto which the stand 20 can be secured. In one embodiment, the connection shaft can include a metallic shaft having a plurality of angled sides 15a-15c, and/or protrusions 15d-15f, in order to be secured to a complementary shaft receiver 50 on the frame. In one preferred embodiment, the connection shaft 15 can include a steel power take off (PTO) shaft, for example, which is an elongated splined shaft that is secured to the base plate 11a via a weld or other permanent method. Of course, any number of other shapes and construction materials can also be utilized herein.

As will be described below, when mated with the shaft receiver 50 of the stand 20, the connection shaft 15 will act to transfer the weight of the stand through the engagement member and onto the tree, thus providing a stable platform for the user. Moreover, by incorporating multiple angles and protrusions, the support shaft will also prevent lateral (i.e. side to side and/or twisting) movement of the frame when in use. Further, by utilizing a single pole design, the tree stand 20 can be securely mounted onto the engagement member in a quick, easy and novel manner.

Figure 4:
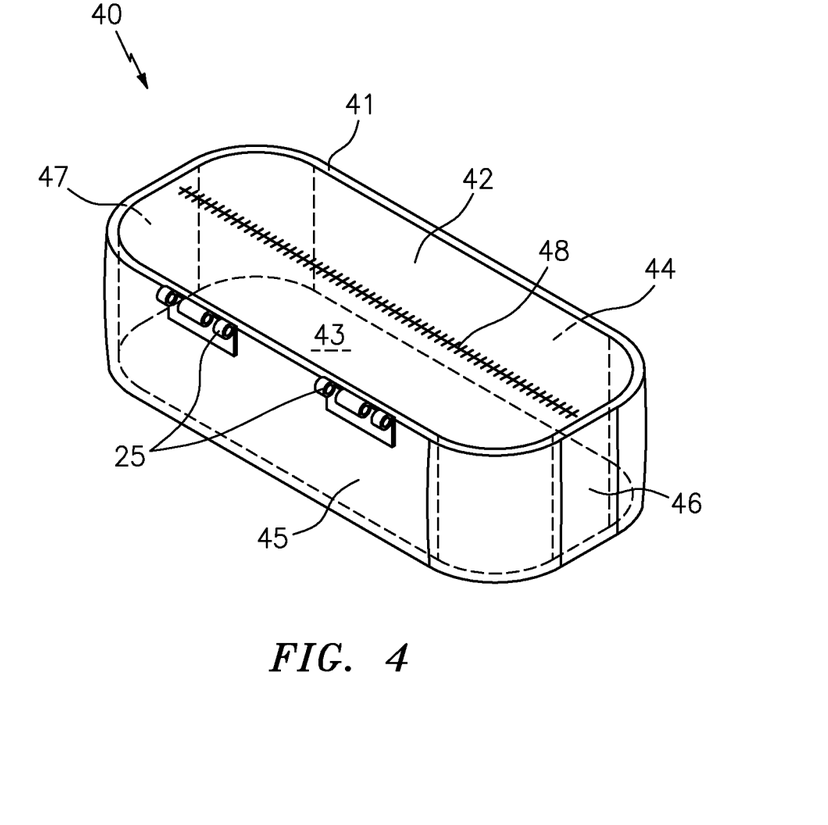
FIG. 4 is a cutout view of a storage compartment for use with the collapsible tree stand device in accordance with one embodiment of the invention.
Figure 5:
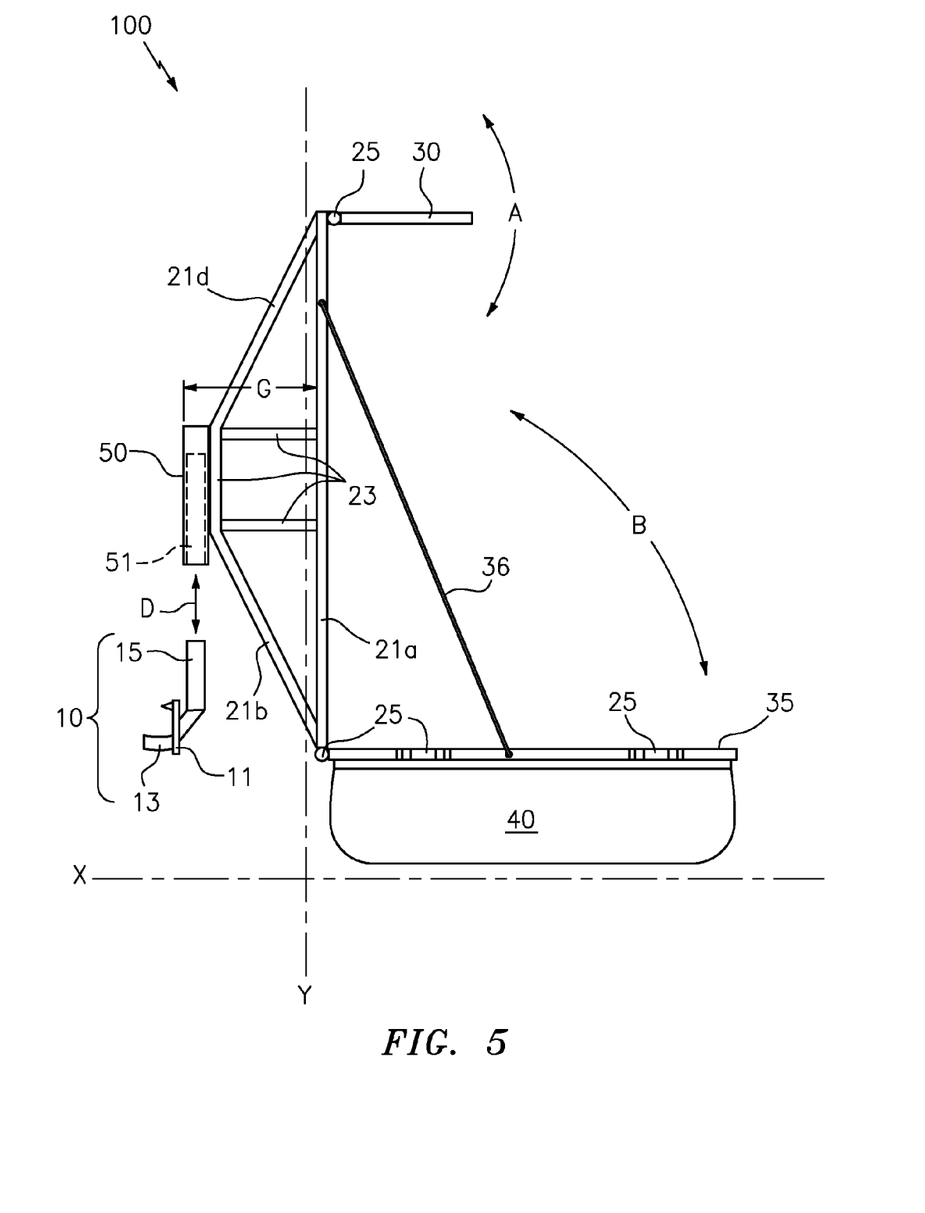
FIG. 5 is a side view of a collapsible tree stand device with integrated storage and mounting system in accordance with one embodiment of the invention.

FIGS. 3-5 illustrate one embodiment of a collapsible, removable stand 20, which can act as an elevated platform for allowing a user to stand, sit and have easy access to multiple storage compartments. As shown, the stand 20 can include frame members 21 and 22, an ergonomically friendly seat 30, a central platform 35, and a pair of integrated storage compartments 40.

The main frame according to one embodiment, can include a pair of parallel frame members 21 and 22 each having an elongated vertical backbone 21a and 22a, a lower rearward angled member 21b and 22b, a rearward vertical member 21c and 22c, and an upper rearward angled member 21d and 22d, respectively. Additionally, bracing members 23 can be interposed between the frames in order to provide additional rigidity and strength. In one embodiment, each of the frame members 21 and 22 can take the overall shape of an isosceles trapezoid having a gap G between the backbones 21a and 22a and the rear vertical members 21c and 22c, respectively.

In one preferred embodiment, each of the support members 21, 22, and the bracing members 23, including all sub components, can be formed as a single integrated frame 24 that is constructed from welded steel or aluminum bars. Of course, any number of other shapes, materials and construction techniques can also be utilized herein. While the dimensions of the elements are not critical, in one embodiment the frame 24 can include a length of between 2 and 4 feet, across a vertical (Y) axis Likewise, the horizontal gap G can include a length of between 8 to 16 inches across a horizontal (X) axis. Of course other dimensions are also contemplated.

The seat 30 can be secured to the top front of the frame 24 via one or more conventional hinges 25. The hinge can allow the seat to fold between a vertical (axis Y) and a horizontal (axis X) position with respect to the frame (See arrow A). In one preferred embodiment, seat 30 can include a lightweight, generally planar member having sufficient strength and size to accommodate an adult user. The seat can preferably be constructed from steel mesh or framed aluminum bars; however, other materials can also be utilized. As will be described below, owing to the gap G created by the frame 24, the seat 30 is not positioned adjacent to the tree itself (See FIG. 6). To this end, when the seat is in use, the users back has additional room, thus allowing the entire seat to be utilized instead of just the outermost portion. Although not illustrated, the seat can also include hardware for allowing lateral rotation of the seat. Such hardware being well known in the art, no further description will be provided herein.

As described herein, a hinge 25 can include any number of known components capable of securing two objects together while allowing one or both objects to pivot/rotate about the other. Several common examples of suitable hinges include: steel door hinges, continuous (i.e., piano) hinges, and/or hidden hinges. Moreover, one or more of the hinges can also include a quiet hinge such as a spring loaded or dampened hinge. Such a feature can act to reduce the noise level when deploying the tree stand by controlling a speed at which the hinged elements open and/or close with respect to each other, thereby preventing the hinged items from making uncontrolled contact and creating a loud slamming noise. Such a feature greatly decreases the likelihood of scaring local wildlife. As the installation and operation of hinges are extremely well known in the art, no further description will be provided.

A folding central platform 35 can be secured to the bottom of the frame 24 via one or more conventional hinges 25. The platform 35 can include a lightweight, generally planar construction capable of providing a place for a user to stand while using the device. In one embodiment, the platform can be constructed from steel mesh or rigid aluminum bars forming a suitable platform onto which a user can stand. Of course other shapes and materials can also be utilized herein.

The hinge 25 can allow the central platform to be positioned in a horizontal (axis X) or vertical (axis Y) orientation with respect to the frame 24 (See arrow B). As shown, a pair of support cables 36 can be secured to each side of the platform 35 and to the sides of the frame 24, in order provide additional strength, and to prevent the platform from breaking. Support cables 36 are well known and can be constructed from lightweight materials such as flexible steel cable, light chain or other known materials.

The tree stand 20 can also include a pair of integrated folding storage compartments 40 which can be secured to the central platform via additional hinges 25. Owing to the gap G between the tree and the stand 20, it becomes possible for the storage compartments to be opened and closed laterally (axis Z, see arrows C) without interference from the tree 2 (see also FIGS. 6 and 7).

As shown in cutout FIG. 4, each storage compartment 40 can include a sturdy, preferably metallic frame 41 for supporting a top panel 42, a bottom panel 43, side panels 44 and 45, front panel 46 and back panel 47. In one embodiment, each panel can be constructed from a lightweight, waterproof collapsible material such as nylon canvas, for example, wherein side panels 44 and 45, front panel 46, and back panel 47 can be secured in a generally orthogonal manner to the bottom panel 43 and the top panel 42 via permanent seams or stitching, thus forming a cavernous interior storage space.

Additionally, the top panel 42 can also include an adjustable seal 48 in order to allow access to the cavernous interior of the compartment. As described herein, an adjustable seal 48 can include, for example, a zipper, sheets of hook and loop material (i.e. Velcro®), and compression fittings such as snaps and buttons, for example, however any number of other devices for creating a reusable seal between two objects can also be utilized herein.

The tree stand 20 can also include a shaft receiver 50 that is permanently secured to the back portion of the frame 24. In one preferred embodiment, shaft receiver 50 can include a generally hollow, steel tubular member having an opening 51 at a bottom portion thereof. Both the opening and the receiver itself will include a complementary shape to that of the connection shaft 15, in order to allow the shaft to be telescopically inserted into the receiver 50 (See arrow D). As stated above, the connection shaft 15 and the receiver 50 can incorporate a shape that, when mated, will prevent lateral movement of the stand.

Figure 6:
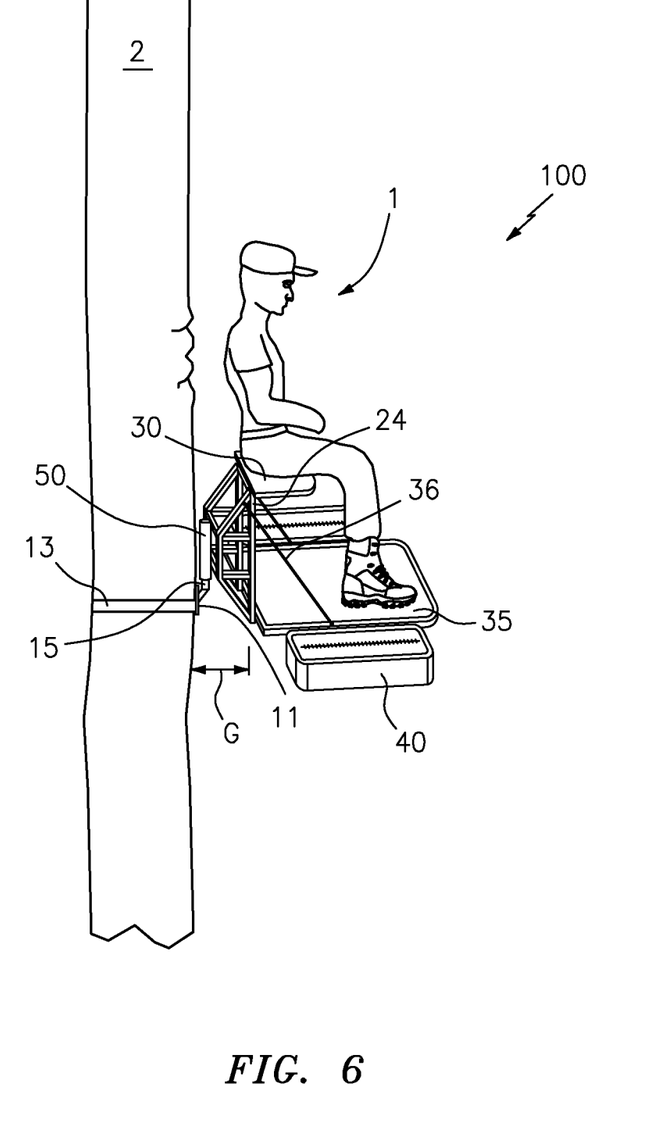
FIG. 6 is a side view of the collapsible tree stand device with integrated storage and mounting system in operation.

As shown in FIG. 6, the system 100 can be secured to a tree 2 in the above described manner. When so deployed, a user 1 can utilize the seat 30 while maintaining a gap G with the tree itself. Moreover, any personal items belonging to the user can be easily stored and retrieved via the storage containers 40.

Figure 7:
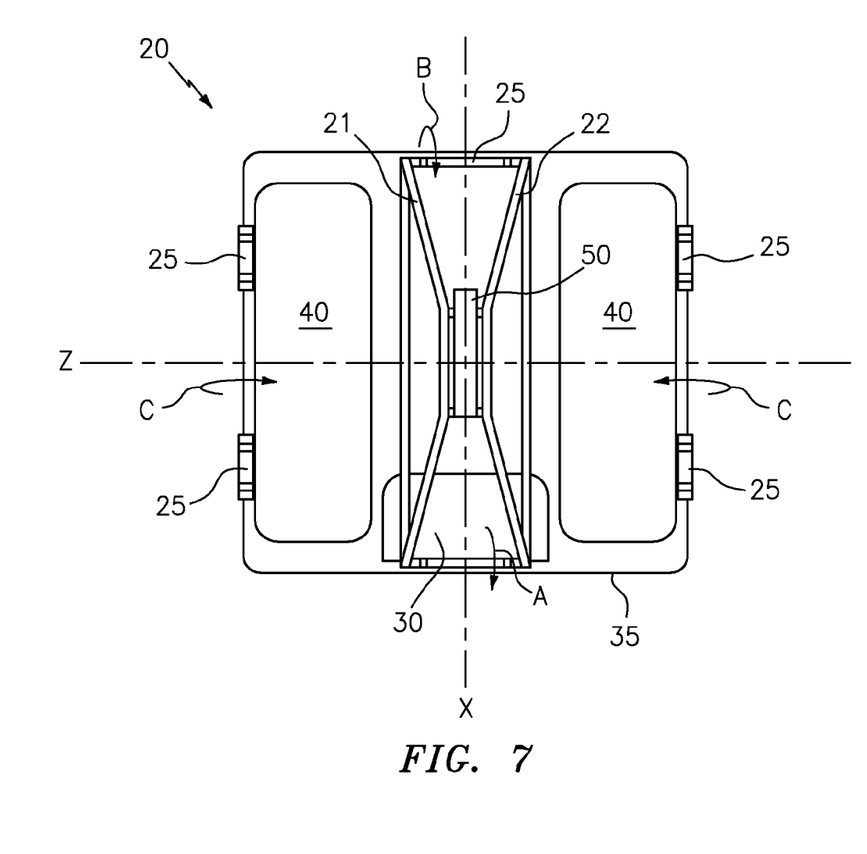
FIG. 7 is a top view of a collapsible tree stand device in a collapsed orientation, in accordance with one embodiment of the present invention.

FIG. 7 illustrates the system 100 in a collapsed position. As described above with respect to arrows A through C, the seat 30 can fold downward (arrow A) until resting against the front of the frame. Next, the frame 24 can fold horizontally (axis X) until the front of the frame and the folded seat are resting on the top surface of the central platform 30 (see arrow B). Next, each of the storage compartments 40 can fold laterally (axis Z) inward until resting on top of the central platform 30 on either side of the folded frame (see arrow C).

Although not illustrated, the tree engagement member can be engaged within the receiver 50, and the strap 13 can be wrapped around the entire collapsed system, in order to allow a user to easily carry the system, including all of their belongings located within the storage compartments 40, on their back, in much the same manner as a backpack.

Figure 8:
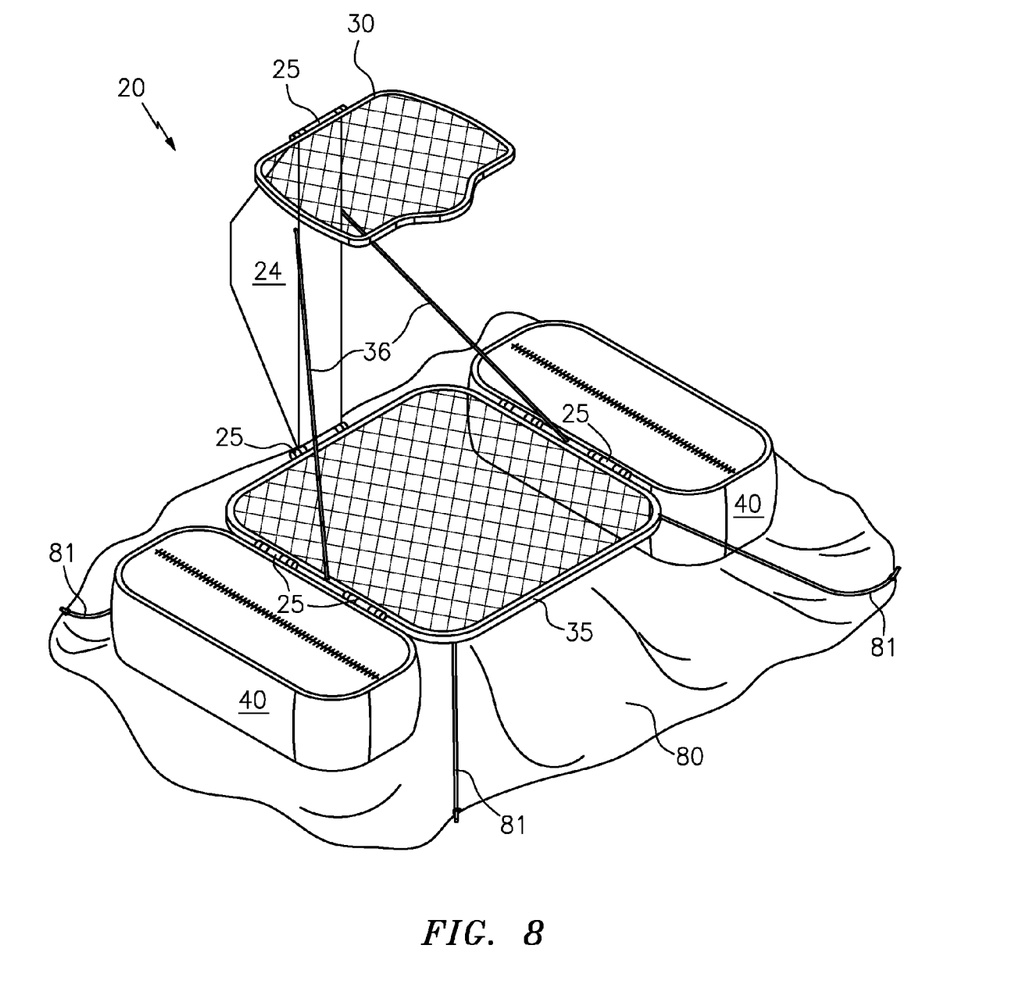
FIG. 8 is a perspective view of a collapsible tree stand device in accordance with another embodiment of the present invention.

FIG. 8 illustrates an alternate embodiment of a collapsible tree stand device 20, that further includes a dirt/debris catching netting 80 deployed beneath the stand 20. As shown, the net 80 can be secured to the bottom of the stand via a plurality of connectors 81, such as rope, twine, or thin aluminum poles, for example. In one preferred embodiment, the net 80 can be constructed from a large sheet of lightweight cloth or composite material capable of preventing any items such as dirt, debris or the user's belongings from falling off of the stand 20 and impacting the ground. Such a feature is particularly useful when animals are nearby, as the noise from falling objects can act as a deterrent and can cause the animal to vacate the area.

Figure 9:
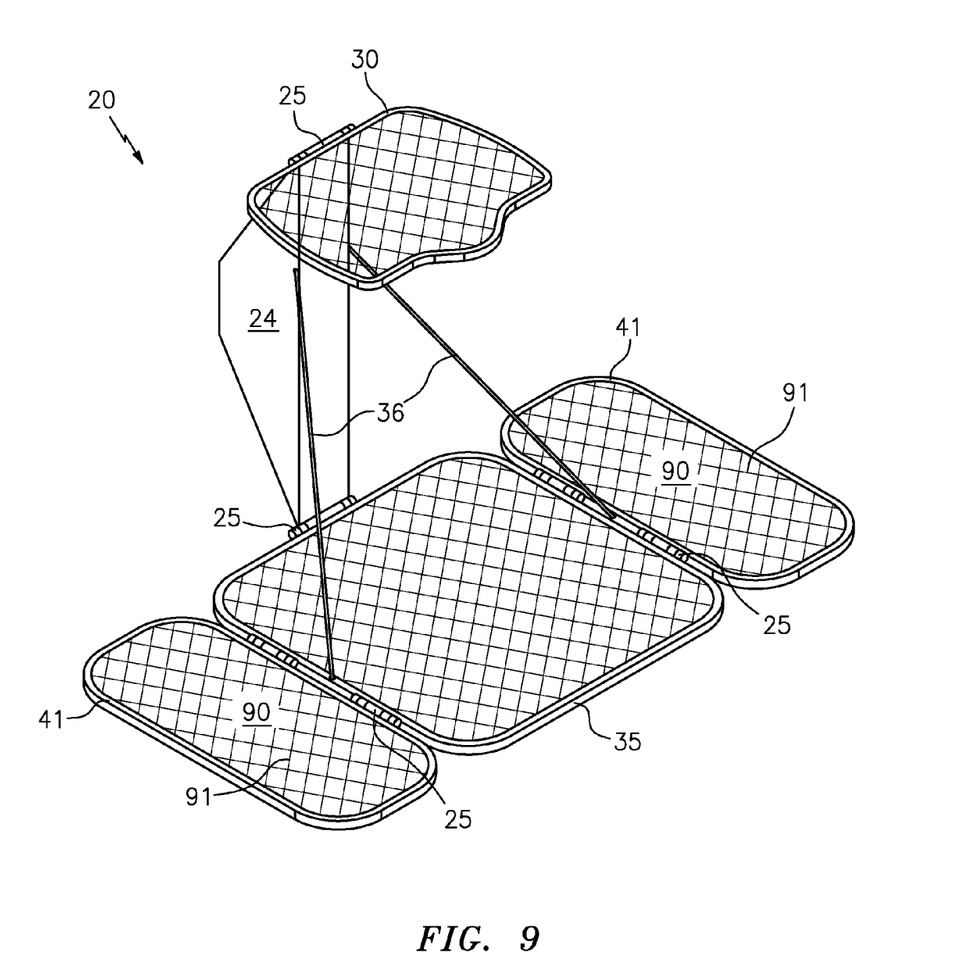
FIG. 9 is a perspective view of a collapsible tree stand device in accordance with yet another embodiment of the present invention.

FIG. 9 illustrates another alternate embodiment of a collapsible tree stand device 20, wherein the storage compartments 40 are replaced with a pair of hinged side platforms 90. As described herein, each of the side platforms 90 can include the metallic frame 41 having a steel mesh surface 91 (or other suitable material) secured thereon. Such a feature can act to provide a greatly increased standing/working area for a user without increasing the overall size of the device when in a folded configuration.

Although described above as including a pair of side platforms, one alternate embodiment (not illustrated) can utilize a single platform 90 and a single storage compartment 40 secured to either side of the central platform, in order to provide a user with options that promote the best of both embodiments.

As described herein, one or more elements of the collapsible tree stand device and system can be secured together utilizing any number of known attachment means such as, for example, screws, glue, compression fittings and welds, among others, and can be constructed utilizing any number of known construction methodologies.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A removable collapsible tree stand device, comprising:
   a frame having a front surface, a back surface and a gap that separates the front and back surfaces, said gap being configured to provide a space between the front surface of the frame and a tree trunk;
   a shaft receiver secured to the back surface of the frame, said shaft receiver being configured to be secured to a connection shaft;
   a seat hingedly secured with a first hinge to an upper portion of a front of the frame, the front of the frame having the front surface of the frame;
   a central platform hingedly secured with a second hinge to a lower portion of the front of the frame;
   a pair of storage compartments hingedly secured with a third hinge and a fourth hinge to the central platform, wherein each of said storage compartments of said pair of storage compartments respectively includes a compartment frame that is hingedly secured to a respective side portion of the central platform, said compartment frames respectively supporting a plurality of panels forming a bag having a cavernous interior, and each of said bags respectively further includes an adjustable seal for providing access to the cavernous interiors; and
   wherein said tree stand device is configured to move between an open and collapsed position, whereby the seat is configured to fold until a bottom portion of the seat rests against the frame, said frame is configured to fold across a horizontal axis until making contact with a top surface of the central platform, and each of said storage compartments are respectively configured to fold across a respective lateral axis until making contact with the top surface of the central platform.

2. The device of claim 1, wherein the gap includes a horizontal distance of between 8and 16inches.

3. The device of claim 1, wherein each of said hinges includes at least one of a steel door hinge, a continuous hinge, and a hidden hinge.

4. The device of claim 1, wherein each of said hinges is configured to reduce a noise level when deploying the tree stand device.

5. The device of claim 1, wherein said bag is constructed from a canvas waterproof material.

6. The device of claim 1, wherein said shaft receiver comprises:
an elongated member having an opening along a bottom portion thereof, said opening being configured to receive a portion of the connection shaft in a telescopic manner, said elongated member including a shape configured to be complementary to a shape of the connection shaft.

7. The device of claim 1, further comprising a debris net configured to be positioned beneath the tree stand device.

8. A collapsible tree stand system for supporting a user at an elevated position on a tree, said
system comprising:
a tree engagement member that includes a mounting plate having a front surface and a back surface, said back surface further including a plurality of teeth configured to engage a tree trunk, a retention strap removably secured to the mounting plate, said strap being configured to wrap around the tree trunk, and a connection shaft permanently secured to the mounting plate; and
a removable collapsible tree stand device that includes a frame having a front surface, a back surface and a gap that separates the front and back surfaces of said frame, said gap being configured to provide a space between the front surface of the frame and the tree trunk;
a shaft receiver secured to the back surface of the frame, said shaft receiver being configured to be secured to the connection shaft;
a seat hingedly secured with a first hinge to an upper portion of a front of the frame, the front of the frame having the front surface of the frame;
a central platform hingedly secured with a second hinge to a lower portion of the front of the frame; and
a pair of storage compartments hingedly secured with a third hinge and a fourth hinge to the central platform, wherein each of said storage compartments of said pair of storage compartments respectively includes a compartment frame that is hingedly secured to a respective side portion of the central platform, said compartment frames respectively supporting a plurality of panels forming a bag having a cavernous interior, and each of said bags respectively further includes an adjustable seal for providing access to the cavernous interiors.

9. The system of claim 8, wherein the gap includes a horizontal distance of between 8 and 16 inches.

10. The system of claim 8 further comprising:
at least one ratchet secured to the mounting plate, said ratchet being configured to secure the engagement member to the tree trunk.

11. The system of claim 8, wherein said mounting plate includes a generally planar construction.

12. The system of claim 8, wherein said mounting plate includes a generally curved construction configured to conform to a shape of the tree trunk.

13. The system of claim 8, wherein said connection shaft includes a plurality of angled side portions configured to prevent lateral movement of the tree stand system.

14. The system of claim 8, wherein said connection shaft includes a plurality of outward radiating protrusions configured to prevent lateral movement of the tree stand system.

15. The system of claim 8, wherein said connection shaft includes a power takeoff shaft configured to prevent lateral movement of the tree stand.

16. A collapsible tree stand system for supporting a user at an elevated position on a tree, said system comprising:
a tree engagement member that includes a mounting plate having a front surface and a back surface, said back surface further including a plurality of teeth configured to engage a tree trunk, a retention strap removably secured to the mounting plate, said strap being configured to wrap around the tree trunk, and a connection shaft permanently secured to the mounting plate; and
a removable collapsible tree stand device that includes a frame having a front surface, a back surface and a gap that separates the front and back surfaces of said frame, said gap being configured to provide a space between the front surface of the frame and the tree trunk;
a shaft receiver secured to the back surface of the frame, said shaft receiver being configured to be secured to the connection shaft;
a seat hingedly secured with a first hinge to an upper portion of a front of the frame, the front of the frame having the front surface of the frame;
a central platform hingedly secured with a second hinge to a lower portion of the front of the frame; and a pair of storage compartments hingedly secured with a third hinge and a fourth hinge to the central platform; and
wherein said tree stand device is configured to move between an open and collapsed position, whereby the seat is configured to fold until a bottom portion of the seat rests against the frame, said frame is configured to fold across a horizontal axis until making contact with a top surface of the central platform, and each of said storage compartments are respectively configured to fold across a respective lateral axis until making contact with the top surface of the central platform, and wherein said storage compartments are respectively capable of completely enclosing items therein.

* * * * *

UNITED STATES PATENT AND TRADEMARK OFFICE
CERTIFICATE OF CORRECTION

PATENT NO. : 8,794,382 B2  Page 1 of 1
APPLICATION NO. : 13/433487
DATED : August 5, 2014
INVENTOR(S) : Jeff Hughes It is certified that error appears in the above-identified patent and that said Letters Patent is hereby corrected as shown below:

On the title page, item [76], correct the name of the inventor from "Hugher" to read "Hughes".

Signed and Sealed this
Twenty-first Day of October, 2014

Michelle K. Lee
*Deputy Director of the United States Patent and Trademark Office*